United States Patent
Yokouchi et al.

[11] Patent Number: 5,707,944
[45] Date of Patent: Jan. 13, 1998

[54] GREASE COMPOSITION

[75] Inventors: Atsushi Yokouchi; Hideki Koizumi; Kenichi Iso; Michiharu Naka; Toshiaki Endo; Yoichi Suzuki, all of Kanagawa, Japan

[73] Assignees: NSK Ltd.; Kyodo Yushi Co., Ltd., both of Tokyo, Japan

[21] Appl. No.: 544,206

[22] Filed: Oct. 17, 1995

[30] Foreign Application Priority Data

Oct. 17, 1994 [JP] Japan ................... 6-275552

[51] Int. Cl.$^6$ ............... C10M 115/08; C10M 169/02
[52] U.S. Cl. ............................. 508/485; 508/552
[58] Field of Search ................... 252/51.5 R; 508/552, 508/485

[56] References Cited

U.S. PATENT DOCUMENTS

| | | | |
|---|---|---|---|
| 5,043,085 | 8/1991 | Kinoshita et al. | 252/51.5 R |
| 5,059,336 | 10/1991 | Naka et al. | 252/51.5 R |
| 5,145,591 | 9/1992 | Kinoshita et al. | 252/51.5 R |
| 5,301,923 | 4/1994 | Asao et al. | 252/12.002 |
| 5,462,684 | 10/1995 | Naka et al. | 252/51.5 R |

FOREIGN PATENT DOCUMENTS

| | | | |
|---|---|---|---|
| 3-250094 | 11/1991 | Japan | C10M 105/06 |
| 4-253796 | 9/1992 | Japan | C10M 169/02 |

*Primary Examiner*—Jacqueline Howard
*Attorney, Agent, or Firm*—Sughrue, Mion, Zinn, Macpeak & Seas, PLLC

[57] ABSTRACT

A grease composition comprising a base oil containing not less than 10% by weight of an ester oil based on the total base oil and having a kinematic viscosity of 50 to 200 mm$^2$/sec at 40° C. and 15 to 35% by weight, based on the total grease composition, of a diurea compound represented by formula (I):

$$R_1\text{—NHCNH—}R_2\text{—NHCNH—}R_3 \quad \text{(I)}$$
$$\overset{\text{O}}{\|} \qquad \overset{\text{O}}{\|}$$

wherein $R_2$ represents an aromatic hydrocarbon group having 6 to 15 carbon atoms; and $R_1$ and $R_3$, which may be the same or different, each represent an aromatic hydrocarbon group having 6 to 12 carbon atoms or an aliphatic hydrocarbon group having 8 to 20 carbon atoms, the proportion of the aromatic hydrocarbon groups in the total of $R_1$ and $R_3$ being 50 to 100 mol %. When applied to outer race rotating bearings, the grease composition is excellent in flaking resistance, leak resistance, and low noise properties and prevents premature seizing under high temperature and high speed conditions.

7 Claims, No Drawings

GREASE COMPOSITION

FIELD OF THE INVENTION

This invention relates to a grease composition comprising a base oil which contains an ester oil as an essential component and a urea-based thickener incorporated in the base oil, and more particularly a grease composition suitable for application to outer race rotating type sealed ball bearings.

BACKGROUND OF THE INVENTION

Sealed rolling bearings are used in electrical parts of automobiles, such as an alternator, an electromagnetic clutch for an air conditioner, an idler pulley, an intermediate pulley, an electric fan motor, etc. The rolling bearings are generally lubricated by grease.

With the spread of front-engine front-drive (FF) automobiles aiming at size and weight reduction and the recent increase of demand for wide car space, the space for the engine has been unavoidably reduced, and the tendency of size and weight reduction of the above-described electrical parts has been developed. Besides, the electrical parts themselves have been required to have improved performance and higher output. For example, a reduction in output of, for example, an alternator or an electromagnetic clutch for an air conditioner due to size reduction has been compensated for by speeding up. Further, since tendency to enclosure of an engine has been increasing because of the demand for low noise, the temperature within an engine room has been increased. Therefore, parts withstanding use in higher temperatures have been demanded.

Lubricating grease for sealed bearings for automobile parts is required to provide bearings with a long lubrication life, to hardly leak, and to have excellent low-temperature performance, anticorrosion, noiseless properties and also flaking resistance.

Under these circumstances, long-life grease for high-speed rolling bearings which satisfies the above-mentioned requirements has hitherto been developed. JP-A-3-250094 (the term "JP-A" as used herein means an "unexamined published Japanese patent application") discloses grease containing an alkyldiphenyl ether oil as a base oil component which has improved flaking resistance and improved high-temperature durability under vibration. Thereafter, JP-A-4-253796 discloses a grease composition comprising a combination of a specific diurea thickener and an alkyldiphenyl ether base oil which exhibits improved oxidation stability and heat stability and controlled volatility and is therefore durable at a high speed and a high temperature. Further, JP-A-5-263091 discloses grease comprising an aromatic diurea or an aromatic ureaurethane compound as a thickener and a mixture of an alkyldiphenyl ether oil and a poly-α-olefin oil at a weight ratio of 20:80 to 80:20 as a base oil, which causes no abnormal flaking and has a long duration of life before seizing occurs in a durability test on an alternator.

However, when the above-mentioned grease compositions are applied to outer race rotating bearings, although the bearings exhibit satisfactory leakproofness and resistance to flaking, premature seizing takes place, and the lubrication life is not always satisfactory.

The inventors of the present invention have extensively studied the above phenomenon and found, as a result, that the conventional base oils comprising a synthetic hydrocarbon oil or an alkyldiphenyl ether oil, individually or as a combination thereof, fail to have a long duration of lubricating action when applied to outer race rotating bearings.

While the reason of the failure is still unclear, grease lubrication seems to be disadvantageous for outer race rotating bearings as compared with inner race rotating bearings in the following points.

1. As the rotational speed increases, the slip ratio tends to increase, and the lubrication part generates great heat, making the lubrication conditions severer.
2. So long as grease is applied to an inner race rotating bearing, the grease on the inner race is subject to a stirring effect due to centrifugal force. To the contrary, such a stirring effect cannot be expected with outer race rotating bearings. Accordingly, the feed to the race surface is decreased, making the lubrication conditions severer.

SUMMARY OF THE INVENTION

In the light of these problems, an object of the present invention is to provide a grease composition which is excellent in flaking resistance and leak resistance, causes no premature seizing even when applied to an outer race rotating bearing, and thereby extends the life of a bearing, and particularly a grease composition suitable for application to outer race rotating bearings used in an electromagnetic clutch, an idler pulley, an intermediate pulley, etc.

The present invention provides a grease composition comprising a base oil containing not less than 10% by weight of an ester oil based on the total base oil and 15 to 35% by weight, based on the total grease composition, of a diurea compound represented by formula (I):

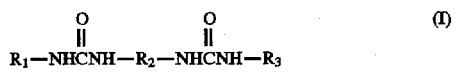

wherein $R_2$ represents an aromatic hydrocarbon group having 6 to 15 carbon atoms; and $R_1$ and $R_3$, which may be the same or different, each represent an aromatic hydrocarbon group having 6 to 12 carbon atoms or an aliphatic hydrocarbon group having 8 to 20 carbon atoms, the proportion of the aromatic hydrocarbon groups in the total of $R_1$ and $R_3$ being 50 to 100 mol %.

DETAILED DESCRIPTION OF THE INVENTION

The ester oil, which should be present in a base oil in an amount of not less than 10% by weight, is not particularly limited. Examples of suitable ester oils include diester oils obtained by the reaction between a dibasic acid and a branched alcohol; aromatic ester oils obtained by the reaction between an aromatic tribasic acid and a branched alcohol; and hindered ester oils obtained by the reaction between a polyhydric alcohol and a monobasic acid. From the viewpoint of heat resistance (in the case where the grease composition is used under a high temperature and high speed condition), it is preferred that the ester oil is at least one selected from aromatic ester oils and hindered ester oils and used singly or an admixture thereof.

The diester oils include dioctyl adipate (DOA), diisobutyl adipate (DIBA), dibutyl adipate (DBA), dioctyl azelate (DOZ), dibutyl sebacate (DBS), dioctyl sebacate (DOS), and methyl acetylricinoleate (MAR-N).

The aromatic ester oils include trioctyl trimellitate (TOTM), tridecyl trimellitate, and tetraoctyl pyromellitate.

The polyhydric alcohol which can be used for the preparation of the hindered ester oils includes trimethylolpropane (TMP), pentaerythritol (PE), dipentaerythritol (DPE), tripentaerythritol (TPE), neopentyl glycol (NPG), and 2-methyl-2-propyl-1,3-propanediol (MPPD).

The monobasic acid which can be used for the preparation of the hindered ester oils typically includes fatty acids having 4 to 18 carbon atoms, such as butyric acid, valeric acid, caproic acid, caprylic acid, enanthic acid, pelargonic acid, captic acid, undecanoic acid, lauric acid, myristic acid, palmitic acid, beef tallow fatty acid, stearic acid, caproleic acid, undecylenic acid, linderic acid, tsuzuic acid, physeteric acid, myristoleic acid, palmitoleic acid, petroselinic acid, oleic acid, elaidic acid, asclepinic acid, vaccenic acid, sorbic acid, linoleic acid, linolenic acid, sabinic acid, and ricinoleic acid. These monobasic acids may be used either individually or as a combination of two or more thereof. Complex esters which are oligo esters between a polyhydric alcohol and a dibasic acid-monobasic acid mixed fatty acid may also be used.

The ester oil which is an essential component of the base oil preferably contains at least one of pentaerythritol ester oils, dipentaerythritol ester oils, tripentaerythritol ester oils, neopentyl type diol ester oils, trimethylolpropane ester oils, complex ester oils, trimellitate ester oils, and pyromellitate ester oils in an amount of 50 to 100% by weight based on the total ester oil. If the content of the above oil in the ester oil is less than 50% by weight, the heat resistance of the base oil will be gradually deteriorated, resulting in a failure of assuring a sufficient life of bearings rotating at a high speed in a high temperature.

It is essential that the ester oil should be present in an amount of not less than 10% by weight based on the total base oil. In order to minimize a leak of grease and to obtain an extended life of bearings, the ester oil concentration in the base oil is preferably 20% by weight or more.

Other oils which can suitably be used in combination with the above-described ester oils to constitute the base oil include synthetic hydrocarbon oils, such as poly-α-olefin oils and α-olefin-ethylene co-oligomer synthetic oils; and ether oils. As for the ether oil, taking high-temperature and high-speed performance into consideration, preferred are phenyl ether oils derived from a $C_{12}$ to $C_{20}$ (di)alkyl chain of diphenyl, triphenyl or tetraphenyl. Such a phenyl ether oil is preferably used in an amount of 0 to 90% by weight based on the total base oil.

The base oil containing not less than 10% by weight of the ester oil preferably has a kinematic viscosity of 50 to 200 mm²/sec, still preferably 70 to 180 mm²/sec, at 40° C. The kinematic viscosity can be measured according to JIS K 2283, Item 3.

If the kinematic viscosity at 40° C. is lower than 50 mm²/sec, a sufficient oil film would not be formed under a great load, and wear increases due to insufficient lubrication, which would ultimately lead to premature seizing. If the kinematic viscosity at 40° C. is higher than 200 mm²/sec, high viscosity resistance produces increased shear stress. It follows that heat is generated under high speed and high load conditions and the fluidity is reduced in low temperatures, producing an abnormal noise.

Accordingly, adjustment of the kinematic viscosity at 40° C. to the above range brings about satisfactory results in terms of life of grease, leak resistance of grease, and flaking resistance of bearings under high temperature and high speed conditions as well as low-temperature performance.

The kinematic viscosity of the base oil can be adjusted by choosing an ester oil having a desired viscosity or by properly combining the above-mentioned base oil components.

In the present invention, a diurea compound represented by formula (I) is used as a thickener:

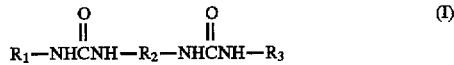

wherein $R_2$ represents an aromatic hydrocarbon group having 6 to 15 carbon atoms; and $R_1$ and $R_3$, which may be the same or different, each represent an aromatic hydrocarbon group having 6 to 12 carbon atoms or an aliphatic hydrocarbon group having 8 to 20 carbon atoms, the proportion of the aromatic hydrocarbon groups in the total groups represented by $R_1$ and $R_3$ being 50 to 100 mol %.

The aliphatic hydrocarbon group having 8 to 20 carbon atoms as represented by $R_1$ and $R_3$ includes straight-chain or branched hydrocarbon groups, such as octyl, nonyl, decyl, undecyl, dodecyl, tridecyl, tetradecyl, pentadecyl, hexadecyl, heptadecyl, octadecyl, octadecenyl, nonadecyl, eicosyl, octenyl, nonenyl, decenyl, undecenyl, dodecenyl, tridecenyl, tetradecenyl, pentadecenyl, hexadecenyl, heptadecenyl, octadecenyl, nonadecenyl, and eicocenyl groups.

The aromatic hydrocarbon group having 6 to 12 carbon atoms as represented by $R_1$ and $R_3$ includes phenyl, toluyl, xylyl, t-butylphenyl, and benzyl groups. $R_1$ and $R_3$ each preferably represent a monovalent aromatic hydrocarbon group. The proportion of aromatic hydrocarbon groups in the total of $R_1$ and $R_3$ should range from 50 to 100 mol %.

The divalent aromatic hydrocarbon group having 6 to 15 carbon atoms as represented by $R_2$ is not particularly limited as long as it has such a structure as has excellent characteristics in terms of heat stability and oxidation stability. Typical examples of $R_2$ are shown below.

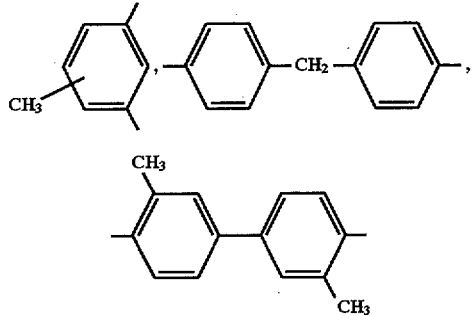

The diurea compound as a thickener is used in an amount of 15 to 35% by weight, preferably 15 to 30% by weight, based on the total grease composition. If the amount of the diurea compound is less than 15%, sufficient flaking resistance cannot be assured, and the grease tends to leak. If the amount of the diurea compound exceeds 35%, the durability of bearings under high temperature and high speed conditions is significantly reduced, and there is a possibility of bearings' producing an abnormal noise in low temperatures.

The thickener comprising the diurea compound can be prepared by an arbitrary method. For example, it can be prepared through a single step by reacting an amine with isocyanate compound at 10° to 200° C. While the reaction may be carried out in the presence of a volatile solvent, it is possible to use the above-mentioned base oil as a reaction solvent. In the latter case, the reaction product as obtained can serve as a grease composition according to the present invention.

If desired, the grease composition of the present invention may contain known additives for enhancing its excellent performance. Suitable additives include other thickeners such as metal soaps, bentonite, and silica gel; antioxidants such as amines, phenols, sulfur compounds, and zinc dithiophosphate; extreme pressure additives such as chlorine-, sulfur- or phosphorus-containing compounds, zinc dithiophosphate, and organomolybdenum; oiliness improvers such as fatty acids and vegetable oils; rust preventives such as petroleum sulfonates, dinonyl naphthalenesulfonate, and sorbitan esters; metal deactivators such as benzotriazole and sodium sulfite; and viscosity index improvers such as polymethacrylate, polyisobutylene, and polystyrene. These additives may be used either individually or as a combination of two or more kinds thereof.

The present invention provides a solution to the problem of premature seizing of outer race rotating bearings by using a base oil containing 10 to 100% by weight of an ester oil while using an aromatic diurea thickener as a countermeasure against flaking. It is believed that the ester oil exerts its oiliness in outer race rotating bearings where severe lubrication conditions seem to be imposed and thereby brings about the effects of the present invention.

The present invention will now be illustrated in greater detail with reference to Examples and Comparative Examples, but it should be understood that the present invention is not deemed to be limited thereto.

EXAMPLES 1 TO 13 AND COMPARATIVE EXAMPLES 1 TO 6

1. Preparation of Grease

A diisocyanate compound was added to a base oil and dissolved by heating. A monoamine having been dissolved in a base oil having the same composition by heating was added thereto. Immediately upon stirring, the mixture produced a gelatinous substance, which was passed through a roll mill to obtain grease. If desired, the gelatinous substance may be heated up to 200° C. in order to conduct the reaction to a sufficient degree. The kinds and amounts of the diisocyanate compound, monoamine and base oil used are shown in Tables 1 through 5 below. The total weight of the diisocyanate compound, monoamine and base oil was 1950 g. An antioxidant and a rust preventive were added to the grease in a total amount of 50 g to give a grease composition weighing 2000 g.

2. Evaluation

Each of the resulting grease compositions was tested in accordance with the following test methods. The results obtained are shown in Tables 1 to 5.

2-1. Seizing Test under High Temperature and High Speed Conditions

Grease (1.3 g) was applied to a contact rubber sealed double-raw angular ball bearing (fitted into a plastic cage) having an inner diameter of 35 mm, an outer diameter of 52 mm, and a width of 20 mm. The bearing was continuously rotated under the conditions of an outer race rotational speed of 13,000 rpm, an inner race temperature of 130° C. and a radial load of 140 kgf, and the operating time until the temperature of the outer race rose to 150° C. or higher due to seizing was measured. Three pieces per each specimen were subject to the measurement, and the durability of the grease under high temperature and high speed conditions was rated according to the average of the three values measured as follows.

Excellent . . . Not less than 1000 hrs.

Good . . . Not less than 700 to less than 1000 hrs.

Medium . . . Not less than 300 to less than 700 hrs.

Bad . . . Less than 300 hrs.

2-2. Flaking Test

Grease (1.0 g) was applied to a contact rubber sealed deep-channel ball bearing (fitted into a plastic cage) having an inner diameter of 12 mm, an outer diameter of 37 mm, and a width of 12 mm. The bearing was continuously rotated under the conditions of an outer race rotational speed repeatedly varying from 1,000 rpm to 6,000 rpm and a radial load of 120 kgf in a room temperature atmosphere, and the time until the inner race surface underwent flaking to cause vibration was measured. Three pieces per each specimen were subject to the measurement, and the resistance to flaking was rated according to the average of the three values measured as follows.

Good . . . Not less than 500 hrs.

Medium . . . Not less than 200 to less than 500 hrs.

Bad . . . Less than 200 hrs. 2-3. Low-temperature Abnormal Noise Test

Grease (1.0 g) was applied to a contact rubber sealed deep-channel ball bearing (fitted into a punched steel cage) having an inner diameter of 12 mm, an outer diameter of 37 mm, and a width of 12 mm. After thoroughly cooling in an atmosphere of −30° C., the bearing was continuously rotated under the conditions of an outer race rotational speed of 3600 rpm and a radial load of 50 kgf in an atmosphere of −10° C. for 30 seconds. Those bearings which were acoustically confirmed to produce an abnormal noise were taken as NG. Four pieces per each specimen were subject to the test, and the total number of NG bearings was counted.

TABLE 1

| | Example 1 | Example 2 | Example 3 | Example 4 |
|---|---|---|---|---|
| Thickener (g): Diisocyanate: | | | | |
| TDI[1] | — | — | — | — |
| MDI[2] | 184 | 166.4 | 225 | 360.4 |
| Monoamine: | | | | |
| p-Toluidine | 78.6 | 86.4 | 135 | 244.8 |
| Stearylamine | 197.7 | — | 140 | — |
| Octylamine | — | 67.2 | — | 74.8 |
| Base oil (g): | | | | |
| Ester A[3] | 640 | 1141 | 1450 | — |
| Ester B[4] | — | — | — | — |
| Ester C[5] | — | — | — | — |
| Ester D[6] | — | — | — | — |
| Ester E[7] | — | — | — | 267 |
| Alkyldiphenyl ether[8] | — | — | — | 1003 |
| Poly-α-olefin[9] | 850 | 489 | — | — |
| Proportion of aromatic hydrocarbon groups in $R_1$ and $R_3$ (mol %) | 50 | 60 | 70 | 80 |
| Thickener content (wt %) | 23 | 16 | 25 | 34 |
| Viscosity of base oil (40° C.; mm²/sec) | 98 | 73 | 53 | 112 |
| Worked penetration (NLGI grade[11]) | No. 2 | No. 1 | No. 2 | No. 3 |
| High temperature high speed durability | excellent | excellent | excellent | good |
| Flaking resistance | good | good | good | good |
| Acoustic durability (number of NG) | 0 | 0 | 0 | 0 |

TABLE 2

|  | Example 5 | Example 6 | Example 7 | Example 8 |
|---|---|---|---|---|
| Thickener (g): | | | | |
| Diisocyanate: | | | | |
| TDI[1] | — | 205.2 | — | 176 |
| MDI[2] | 270 | — | 286.2 | — |
| Monoamine: | | | | |
| p-Toluidine | 230 | 205.2 | 194.4 | 172 |
| Stearylamine | — | 129.6 | — | — |
| Octylamine | — | — | 59.4 | 52 |
| Base oil (g): | | | | |
| Ester A[3] | 551 | 268 | 973 | 574 |
| Ester B[4] | — | — | — | 976 |
| Ester C[5] | — | — | — | — |
| Ester D[6] | — | — | — | — |
| Ester E[7] | — | — | — | — |
| Alkyldiphenyl ether[8] | 899 | — | 437 | — |
| Poly-α-olefin[9] | — | 1142 | — | — |
| Proportion of aromatic hydrocarbon groups in $R_1$ and $R_3$ (mol %) | 100 | 80 | 80 | 80 |
| Thickener content (wt %) | 25 | 27 | 27 | 20 |
| Viscosity of base oil (40° C.; mm²/sec) | 78 | 154 | 65 | 182 |
| Worked penetration (NLGI grade[11]) | No. 2 | No. 2 | No. 2 | No. 2 |
| High temperature high speed durability | excellent | excellent | excellent | excellent |
| Flaking resistance | good | good | good | good |
| Acoustic durability (number of NG) | 0 | 0 | 0 | 0 |

TABLE 4

|  | Comparative Example 1 | Comparative Example 2 | Comparative Example 3 |
|---|---|---|---|
| Thickener (g): | | | |
| Diisocyanate: | | | |
| TDI[1] | 147.6 | — | — |
| MDI[2] | — | 152 | 312 |
| Monoamine: | | | |
| p-Toluidine | 36.0 | 52 | 162 |
| Stearylamine | — | 196 | — |
| Octylamine | 176.4 | — | 126 |
| Base oil (g): | | | |
| Ester A[3] | — | — | — |
| Ester B[4] | — | — | — |
| Ester C[5] | — | — | 1350 |
| Ester D[6] | — | — | — |
| Ester E[7] | — | — | — |
| Alkyldiphenyl ether[8] | — | 1550 | — |
| Poly-α-olefin[9] | 1590 | — | — |
| Proportion of aromatic hydrocarbon groups in $R_1$ and $R_3$ (mol %) | 20 | 40 | 60 |
| Thickener content (wt %) | 18 | 20 | 30 |
| Viscosity of base oil (40° C.; mm²/sec) | 149 | 97 | 29 |
| Worked penetration (NLGI grade[11]) | No. 2 | No. 2 | No. 2 |
| High temperature high speed durability | bad | good | medium |
| Flaking resistance | good | good | good |
| Acoustic durability (number of NG) | 0 | 2 | 0 |

TABLE 3

|  | Example 9 | Example 10 | Example 11 | Example 12 | Example 13 |
|---|---|---|---|---|---|
| Thickener (g): | | | | | |
| Diisocyanate: | | | | | |
| TDI[1] | — | — | — | — | — |
| MDI[2] | 225 | 225 | 225 | 225 | 225 |
| Monoamine: | | | | | |
| p-Toluidine | 135 | 135 | 135 | 135 | 135 |
| Stearylamine | 140 | 140 | 140 | 140 | 140 |
| Octylamine | — | — | — | — | — |
| Base oil (g): | | | | | |
| Ester A[3] | — | — | — | — | — |
| Ester B[4] | 493 | — | — | — | 740 |
| Ester C[5] | 957 | 769 | 972 | — | — |
| Ester D[6] | — | — | 478 | 174 | — |
| Ester E[7] | — | 681 | — | — | — |
| Ester F[10] | — | — | — | — | 710 |
| Alkyldiphenyl ether[8] | — | — | — | — | — |
| Poly-α-olefin[9] | — | — | — | 1276 | — |
| Proportion of aromatic hydrocarbon groups in $R_1$ and $R_3$ (mol %) | 70 | 70 | 70 | 70 | 70 |
| Thickener content (wt %) | 25 | 25 | 25 | 25 | 25 |
| Viscosity of base oil (40° C.; mm²/sec) | 64 | 67 | 52 | 153 | 53 |
| Worked penetration (NLGI grade[11]) | No. 2 | No. 2 | No. 2 | No. 2 | No. 2 |
| High temperature high speed durability | good | good | good | good | good |
| Flaking resistance | good | good | good | good | good |
| Acoustic durability (number of NG) | 0 | 0 | 0 | 0 | 0 |

TABLE 5

|  | Comparative Example 4 | Comparative Example 5 | Comparative Example 6 |
|---|---|---|---|
| Thickener (g): | | | |
| Diisocyanate: | | | |
| TDI[1) | — | — | 180 |
| MDI[2) | 124.9 | 395.2 | — |
| Monoamine: | | | |
| p-Toluidine | 86.4 | 243.2 | 220 |
| Stearylamine | — | — | — |
| Octylamine | 28.8 | 121.6 | — |
| Base oil (g): | | | |
| Ester A[3) | — | — | 372 |
| Ester B[4) | — | — | 1178 |
| Ester C[5) | — | — | — |
| Ester D[6) | — | — | — |
| Ester E[7) | — | — | — |
| Alkyldiphenyl ether[8) | 1368 | 416 | — |
| Poly-α-olefin[9) | 342 | 774 | — |
| Proportion of aromatic hydrocarbon groups in $R_1$ and $R_3$ (mol %) | 80 | 70 | 100 |
| Thickener content (wt %) | 12 | 38 | 20 |
| Viscosity of base oil (40° C.; mm²/sec) | 108 | 129 | 238 |
| Worked penetration (NLGI grade[11)) | No. 0 | No. 3 | No. 2 |
| High temperature high speed durability | medium | bad | good |
| Flaking resistance | bad | good | good |
| Acoustic durability (number of NG) | 1 | 1 | 4 |

Note:
[1): Tolylene diisocyanate (molecular weight: 174)
[2): Diphenylmethane diisocyanate (molecular weight: 250)
[3): Dipentaerythritol ester oil (53 mm²/sec, 40° C.)
[4): Dipentaerythritol ester oil (417 mm²/sec, 40° C.)
[5): Pentaerythritol ester oil (29 mm²/sec, 40° C.)
[6): Pentaerythritol complex ester oil (164 mm²/sec, 40° C.)
[7): Trimellitic ester oil (213 mm²/sec, 40° C.)
[8): Alkyldiphenyl ether (97 mm²/sec, 40° C.)
[9): Mixture of PAO (poly-α-olefin) A (400 mm²/sec) and PAO B (45 mm²/sec) at a A:B mixing ratio (by weight) of 55:45 (150.6 mm²/sec, 40° C.)
[10): Dioctyl sebacate (11.3 mm²/sec, 40° C.)
[11): Number defined by National Lubricating Grease Institute (NLGI)

As is apparent from the results in Tables 1 to 5, the grease composition of the present invention shows excellent results in every test. Grease compositions containing no ester oil as a base oil component cannot satisfy all the testing items. The superiority of the present invention has thus been proved.

As has been fully described, the grease composition of the present invention is excellent in working life under high temperature and high speed conditions, flaking durability of bearings to which it is applied, and low-temperature characteristics.

While the invention has been described in detail and with reference to specific examples thereof, it will be apparent to one skilled in the art that various changes and modifications can be made therein without departing from the spirit and scope thereof.

What is claimed is:

1. A grease composition comprising a base oil containing not less than 10% by weight of an ester oil based on the total base oil and having a kinematic viscosity of 50 to 200 mm²/sec at 40° C. and 15 to 35% by weight, based on the total grease composition, of a diurea compound represented by formula (I):

$$R_1-NHCNH-R_2-NHCNH-R_3 \quad \text{(I)}$$
$$\overset{O}{\underset{\|}{}} \quad \overset{O}{\underset{\|}{}}$$

wherein $R_2$ represents an aromatic hydrocarbon group having 6 to 15 carbon atoms; and $R_1$ and $R_3$, which may be the same or different, each represent an aromatic hydrocarbon group having 6 to 12 carbon atoms or an aliphatic hydrocarbon group having 8 to 20 carbon atoms, the proportion of the aromatic hydrocarbon groups in the total of $R_1$ and $R_3$ being 50 to 100 mol %.

2. The grease composition of claim 1, wherein said ester oil is a hindered ester oil, an aromatic ester oil, or a mixture thereof.

3. The grease composition of claim 1, wherein said ester oil contains at least one of pentaerythritol ester oils, dipentaerythritol ester oils, tripentaerythritol ester oils, trimethylolpropane ester oils, trimellitate ester oils, and pyromellitate ester oils in an amount of 50 to 100% by weight based on the total ester oil.

4. The grease composition of claim 1, wherein said ester oil contains at least one neopentyl diol ester oil.

5. The grease composition of claim 1, wherein said ester oil contains at least one complex ester oil which is an ester of a polyhydric alcohol and a mixture of a monobasic acid and a dibasic acid.

6. The grease composition of claim 1, wherein said base oil has a kinematic viscosity of 70 to 180 mm²/sec at 40° C.

7. The grease composition of claim 1, wherein said base oil contains 0% by weight of a phenyl ether oil.

* * * * *